A. J. ANDERSON.
POTATO PLANTER.
APPLICATION FILED OCT. 12, 1916.
1,299,652.
Patented Apr. 8, 1919.
2 SHEETS—SHEET 1.
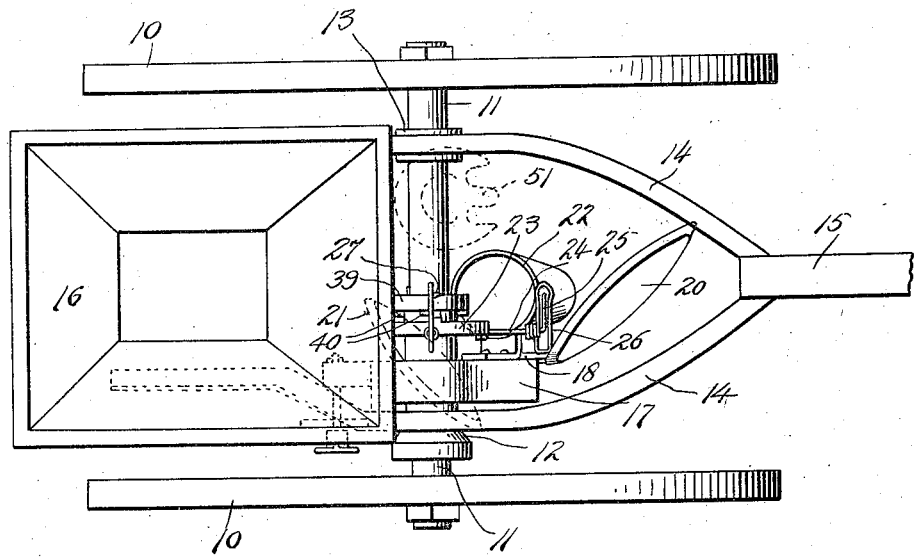
Fig. 1.
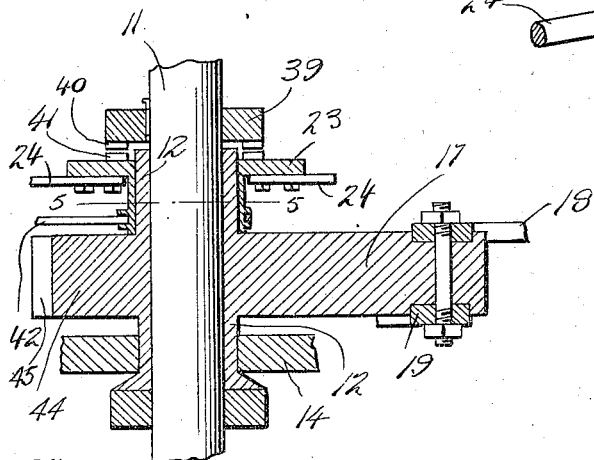
Fig. 3.
Fig. 4.
Witness
Chas. E. Kemper.
A. P. Hollingsworth
Inventor
Anton J. Anderson.
By Richard Owen,
his Attorney A. J. ANDERSON.
POTATO PLANTER.
APPLICATION FILED OCT. 12, 1916.
1,299,652.
Patented Apr. 8, 1919.
2 SHEETS—SHEET 2.
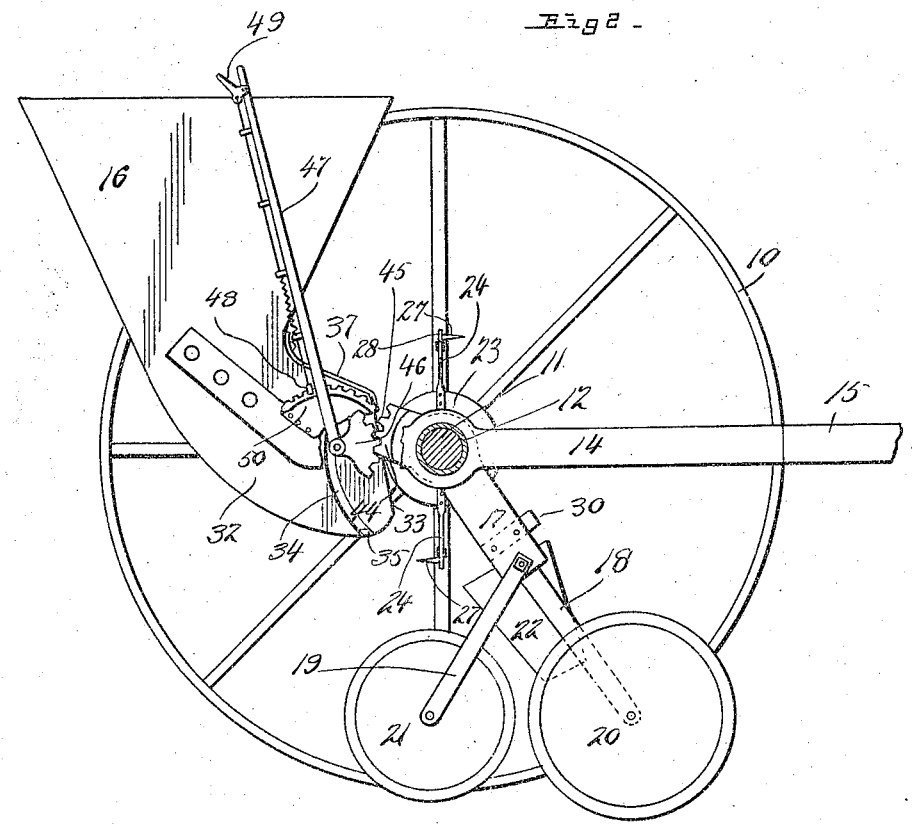
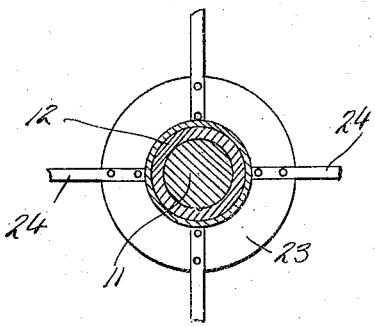
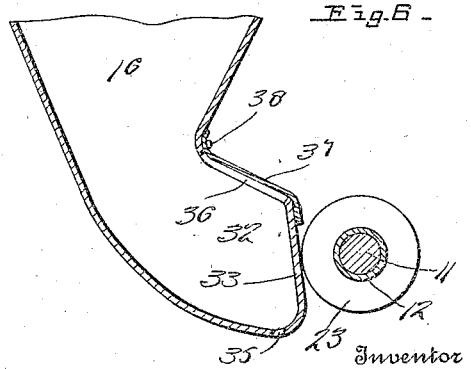
Inventor
Anton J. Anderson.

UNITED STATES PATENT OFFICE.

ANTON J. ANDERSON, OF HOPKINS, MINNESOTA.

POTATO-PLANTER.

1,299,652.

Specification of Letters Patent.

Patented Apr. 8, 1919.

Application filed October 12, 1916. Serial No. 125,218.

*To all whom it may concern:*

Be it known that I, ANTON J. ANDERSON, a citizen of Sweden, residing at Hopkins, in the county of Hennepin and State of Minnesota, have invented certain new and useful Improvements in Potato-Planters, of which the following is a specification.

This invention relates to planting implements, and particularly to an implement for planting potatoes, and has for its principal object to provide a machine mounted on wheels and having a receptacle for seed potatoes, and devices adapted to be operated when desired by one of the ground wheels for picking potatoes from said receptacle and conveying them into positions to be deposited in a furrow opened by the machine and afterward covered by suitable means also mounted upon the implement.

Another object of the invention is to provide a planting device for a machine of this kind which has a sharp pointed end for penetrating the potatoe as it passes through the receptacle containing the potatoes and removing therefrom only the ones so impaled and carrying it into position for planting.

A further object of the invention is to provide a planter of this type with means preferably a disk for opening a furrow and after depositing the seed potato in said furrow to employ a second disk for closing the furrow and covering the potatoes.

With these objects in view as the principal features, the invention consists of the novel construction, combination and arrangement of parts hereinafter described, pointed out in the claims and illustrated in the accompanying drawings, in which:

Figure 1 is a plan view of a potato planter constructed in accordance with the present invention.

Fig. 2 is a side elevation of the same with one of the ground wheels removed.

Fig. 3 is a detailed sectional view through the driving axle and main bearing of the planter.

Fig. 4 is a perspective view of the extremity of the planting member.

Fig. 5 is a sectional view on the line 5—5 of Fig. 3, and

Fig. 6 is a sectional view on the line 6—6 of Fig. 1.

In the drawings, 10 indicates the ground wheels of the improved planter mounted rigidly on the ends of a horizontal shaft 11 that rotates in bearings 12 and 13 mounted upon a frame 14 secured at its forward end to a tongue 15 for drawing the planter over the ground.

The frame 14 includes two side beams bent to suitable shape and extending in rear of the axle to support a hopper or receptacle 16 for the seed potatoes, said beams being brought together in front of the axle for attachment to the tongue 15. The bearing 12 on one of the beams of the frame 14 passes through said beam and is adapted to rock therein, the axle 11 passing through and rotating in said bearing. Projecting downwardly and forwardly from the bearing 12 is a leg 17 on the lower end of which are bolted two beams 18 and 19 on the former of which is pivotally mounted a furrow opening disk 20 while the beam 19 carries a similar but smaller disk 21 for closing the furrow after the potatoes have been planted. Secured to the leg 17 between the disks is a downwardly tapering tube 22 placed at an angle to the ground with its lower end in position to direct potatoes for planting that fall therein to the furrow behind the disk 20 and in front of the disk 21.

Rotatably mounted on the inner end of the bearing 12 is a disk 23 on one side of which are bolted two or more radial arms 24, the number of arms being regulated by the distance it is desired to separate the individual plants. Each arm 24 is of such length as to bring it near the upper end of the tube 22 when the disk is rotated, each of said arms having its outer end bent at right angles toward the center of the machine and parallel with the axle and at a point in the vertical plane of said tube the terminal end of the arm is again bent at right angles to the portion 25 and also to the main part of the arm 24 as clearly shown in Fig. 4. The terminal end 27 of each arm 24 is pointed as shown, for engaging a potato and withdrawing the same from the hopper in a manner hereinafter described. Pivoted on each arm 24 is a loop-like finger 26 that is adapted to rock on the arm 24 and when so moved the outer end 29 of the finger moves longitudinally of the point 27 of the arm, engages the potato, if one happens to be caught thereon, and pushes it from the point. For the purpose of rocking the finger 26, there is a projection 28 thereon extending rearwardly or away from the finger and so positioned that when the arm, during the rotation of disk 23 rides above the open end of the tube 22, the projection 28 on the finger strikes a pin or lug 30 projecting from the leg 17 and rocks the finger. The projection slipping from said lug after the loop 29 has reached the pointed end of the arm 24, the finger is returned to normal position by a spring 31.

The receptacle 16 is hopper shaped, being smaller at its lower end than at the top, said lower end continuing downwardly and forwardly as at 32 toward the axle 11 where it terminates with a vertical wall 33. The potatoes which fill the hopper extend downwardly through said lower portion 32 and fill the same. In one side of the lower portion 32 of the hopper is a curved slot 34 concentric with the axle 11 and of a size sufficient to permit the portion 25 and finger 26 of the arm 24 to pass freely through as the disk 23 is rotated. There is also a straight transverse slot 35, parallel with the axle, formed in the bottom of the curved portion 32 of the hopper and connected at one end with the lower end of the slot 34 to permit the planting finger to enter the hopper and withdraw a potato therefrom. The top of the curved portion 32 of the hopper has an opening 36 therein through which the finger with a potato thereon makes its exit from the hopper, said opening being covered by a loose cloth 37 nailed to the hopper as at 38 above the opening 36, said cloth hanging downwardly over the opening 36 and the front 33 of the hopper.

Keyed on the axle 11 close to the inner ends of the bearing 12 is a disk 39 having clutch teeth 40 on the side facing the disk 23 which also is provided with coöperating clutch teeth 41 on its inner face. The disk 23 is mounted to slide longitudinally on the bearing 12 a sufficient distance to engage the clutch teeth 40 with the clutch teeth 41 and thus rotate the disk 23 and the planting fingers carried thereby. Any suitable means such as a lever 42 engaging a groove in the hub of the disk 23 may be employed for engaging and disengaging the disks 23 and 39.

The leg 17 where the axle 11 and bearing 12 pass therethrough is enlarged to provide sufficient metal for strength and at the rear of the enlargement is a projection 44 on the rear edge of which are formed a few gear teeth 45 with which engages a sector 46 pivoted in engagement with the frame bar 14 and having an upward arm 47 secured thereto by means of which said sector is rocked and the teeth thereon engaging the teeth 45 to raise and lower the leg 17 and the furrow disks 20 and 21. A latch 48 operated by a hand lever 49 is mounted on the arm 47 and engages notches in a curved plate 50 bolted to the frame and serves to hold the lever 47 and the leg 17 and parts connected thereto in any position of elevation.

In using this implement the operator occupying the seat 51 drives to the field where the potatoes are to be planted, first having filled the hopper 16 with seed potatoes of proper size and disconnected the disk 23 by separating the clutch teeth 40 and 41. After reaching the field and ready for planting, the disk 23 is moved endwise on the bearing 12 to engage said disk with the disk 39 and as the implement is driven along the field the shaft 11 will cause the arms 24 to turn about the axle and the pointed extremities 27 thereof entering through the slots 34 and 35 in the lower end of the hopper will each in succession impale a potato and carry it out through the opening 36 in the top of the hopper readily lifting the cloth cover 37 as it passes through the opening. The arms 24 continuing their rotation will be brought above the open upper end of the tube 22 and in this position the projections 28 on the finger 26 striking the stop 30 will hold the same momentarily against moving while the arm 24 continues thereby causing the finger 26 to swing on the arm and its curved outer ends 29 moving along the pointed end 27 of the arm will sweep the potato therefrom into the tube 22 and falling down said tube will enter the furrow in the ground opened by the disk 20 in advance of the tube, said furrow being immediately closed and the potato covered by the disk 21 following.

While I have shown and described the best form of the present device as known to me, it is to be understood that various changes may be made in the construction and operation of the parts without departing from the spirit of the invention and such changes are held by me within the terms of the accompanying claims.

What is claimed is:

1. A mechanism for the purpose set forth including a receptacle having a hopper shaped upper portion and a downwardly and forwardly curved under portion, the latter portion having a curved slot in one side and a straight slot in the bottom of said portion extending transversely thereof and connecting with the lower end of the curved slot, a shaft, a rotatable disk carried by said shaft, a plurality of arms projecting from said disk, each arm having a right angled projection on its outer end, a pin on the end of each projection adapted to enter said receptacle through the slots therein and after impaling an article remove the same from the receptacle, and means carried by the arm for automatically removing said articles from the pins.

2. A mechanism for the purpose set forth including a receptacle for holding seed potatoes having a forwardly curved projecting lower end with a curved slot in the side thereof and a straight slot in the bottom extending transversely of said curved projecting end of the receptacle and connecting with the curved slot at its lower end, a shaft, a disk rotatably mounted on said shaft, a plurality of arms projecting radially from said disk, each arm having a right angled outer end terminating with an angular projecting point, means for coupling said disk with said shaft for rotating the disk whereby said arms are caused to pass through the slots in said receptacle and each point thereon to impale a seed potato and remove the same from the receptacle, and means carried by each arm actuated by a fixed stop for causing the removal of the potatoes from said points.

3. A mechanism for the purpose set forth including a receptacle for holding seed potatoes having a downwardly and forwardly curved delivery end formed with a straight transversely extending slot in the bottom of said delivery end and a curved slot in the side thereof, its lower end connecting with one end of said straight slot, a shaft, a disk rotatably mounted on said shaft, a clutch member for engaging said disk with said shaft to cause the rotation of said disk, a loose cover extending over the top of said delivery end, a plurality of arms projecting radially from said disk, each provided with an inwardly directed finger terminating in a pointed end projecting at a right angle to said finger, said fingers with their pointed ends being positioned to enter the receptacle through said slots as the disk is rotated and each pointed end adapted to impale a potato and remove the same from the receptacle through the open top thereof below the loose cover, a pivoted stripper mounted on each finger for disengaging the potato from the pointed end and a fixed lug for engaging the stripper to operate the same.

4. In a mechanism for the purpose set forth, a hopper discharging device comprising a rotatable shaft, a disk loosely mounted in said shaft, means for connecting said disk to the shaft for rotation therewith, a plurality of arms projecting radially from said disk, each arm having its outer end bent at a right angle to lie parallel to the axis of said disk, a pointed terminal to the outer end of each of said arms adapted to serve as an impaling means for removing potatoes from a receptacle, a finger pivotally mounted on the outer end of each of said arms having a looped end extending around the pointed terminal thereof and adapted when moved to disengage the object impaled, and a stop to engage said pivoted fingers to operate the same.

In testimony whereof I affix my signature in presence of two witnesses.

ANTON J. ANDERSON.

Witnesses:
A. SCHILLER,
A. R. LOFGREN.

Copies of this patent may be obtained for five cents each, by addressing the "Commissioner of Patents, Washington, D. C."